(12) United States Patent
Higuchi et al.

(10) Patent No.: US 8,971,283 B2
(45) Date of Patent: Mar. 3, 2015

(54) RADIO RESOURCE ASSIGNMENT METHOD FOR PHYSICAL CHANNEL IN UPLINK, AND TRANSMITTER FOR MOBILE APPARATUSES

(75) Inventors: Kenichi Higuchi, Yokohama (JP); Hiroyuki Atarashi, Yokohama (JP); Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 1082 days.

(21) Appl. No.: 11/909,704

(22) PCT Filed: Mar. 27, 2006

(86) PCT No.: PCT/JP2006/306112
§ 371 (c)(1),
(2), (4) Date: Nov. 10, 2008

(87) PCT Pub. No.: WO2006/106616
PCT Pub. Date: Oct. 12, 2006

(65) Prior Publication Data
US 2009/0103483 A1 Apr. 23, 2009

(30) Foreign Application Priority Data
Mar. 31, 2005 (JP) .................................. 2005-105498

(51) Int. Cl.
*H04W 72/02* (2009.01)
*H04W 74/02* (2009.01)
(Continued)

(52) U.S. Cl.
CPC .......... *H04W 72/0493* (2013.01); *H04L 5/0005* (2013.01); *H04L 5/0064* (2013.01);
(Continued)

(58) Field of Classification Search
CPC .......... H04W 72/12–72/1294; H04W 72/0453
USPC ......... 370/319, 321, 322, 329, 330, 336, 337, 370/344–348, 431, 436, 437, 442–444, 370/478; 455/450–452.2, 509
See application file for complete search history.

(56) References Cited

U.S. PATENT DOCUMENTS 6,351,459 B1 * 2/2002 Kondo ........................... 370/330
6,614,778 B1 * 9/2003 Hwang ......................... 370/348
(Continued)

FOREIGN PATENT DOCUMENTS

AU 200019529 A1 9/2000
CN 1269085 A 10/2000
(Continued)

OTHER PUBLICATIONS

Taiwanese Office Action for Taiwanese Application No. 095110957, mailed on Dec. 12, 2008 (13 pages).
(Continued)

*Primary Examiner* — Pao Sinkantarakorn
(74) *Attorney, Agent, or Firm* — Osha Liang LLP

(57) ABSTRACT

A radio resource assignment method for a physical channel in an uplink directed from a mobile apparatus to a base station in a radio communication system, includes: assigning a contention-based channel and a scheduled channel according to one of a time division scheme, a frequency division scheme, and a hybrid scheme of the time division scheme and the frequency division scheme. In addition, radio resources are properly assigned to each of the contention-based channel, a common control channel of the scheduled channel, and a shared data channel of the scheduled channel.

3 Claims, 14 Drawing Sheets

(51) Int. Cl.
  *H04W 72/04* (2009.01)
  *H04L 5/00* (2006.01)
  *H04L 1/00* (2006.01)

(52) U.S. Cl.
  CPC ............. *H04L5/0092* (2013.01); *H04L 1/0003* (2013.01); *H04L 1/0009* (2013.01); *H04L 5/0007* (2013.01); *H04L 5/0016* (2013.01); *H04L 5/0039* (2013.01); *H04W 74/02* (2013.01)
  USPC ......................................... 370/330; 370/478

(56) References Cited

U.S. PATENT DOCUMENTS

| | | | |
|---|---|---|---|
| 6,631,124 | B1 | 10/2003 | Koorapaty et al. |
| 6,954,422 | B1 | 10/2005 | Suehiro et al. |
| 7,050,814 | B2 | 5/2006 | Al-Housami |
| 2002/0141435 | A1* | 10/2002 | Newberg et al. ............. 370/442 |
| 2002/0159430 | A1 | 10/2002 | Atarashi et al. |
| 2003/0072254 | A1* | 4/2003 | Ma et al. ........................ 370/208 |
| 2004/0248520 | A1 | 12/2004 | Miyoshi |
| 2004/0264548 | A1 | 12/2004 | Miyoshi |
| 2005/0054347 | A1 | 3/2005 | Kakani |
| 2005/0180515 | A1* | 8/2005 | Orihashi et al. ............. 375/260 |
| 2006/0067421 | A1* | 3/2006 | Walton et al. ................. 375/267 |

FOREIGN PATENT DOCUMENTS

| | | | |
|---|---|---|---|
| CN | 1371584 | | 9/2002 |
| EP | 1 445 873 A2 | | 8/2004 |
| JP | 9-18441 A | | 1/1997 |
| JP | 10-209956 A | | 8/1998 |
| JP | 11-215095 A | | 8/1999 |
| JP | 11-261448 A | | 9/1999 |
| JP | 2001-197037 A | | 7/2001 |
| JP | 2003-101499 A | | 4/2003 |
| JP | 2003-513588 A | | 4/2003 |
| JP | 2003-264873 A | | 9/2003 |
| JP | 2003-309533 A | | 10/2003 |
| JP | 2004-140783 A | | 5/2004 |
| KR | 2001-0082663 A | | 8/2001 |
| TW | 365090 | | 7/1999 |
| WO | 00/42803 | | 7/2000 |
| WO | 01/17304 | | 3/2001 |
| WO | WO 03/026159 | * | 3/2003 ............. H04B 1/713 |
| WO | 03/041438 A1 | | 5/2003 |
| WO | WO2004021617 | * | 3/2004 ............... H04B 1/69 |

OTHER PUBLICATIONS esp@cenet patent abstract for Korean Publication No. 20010082663, Publication date Aug. 30, 2001 (1 page).
International Search Report for PCT/JP2006/306112 dated Jun. 13, 2006, with English translation, 5 pages.
Taiwanese Office Action for Taiwanese patent application No. 95110957, dated Oct. 5, 2007, and English translation thereof, 8 pages.
English Abstract from esp@cenet, for patent application No. DE19940753, corresponding to Chinese patent application No. CN1371584, Publication Date: Sep. 25, 2002, 1 page.
Machine English translation from esp@cenet for WO01/17304, corresponding to patent applications No. DE19940753 and CN1371584, 7 pages.
Chinese Office Action for Application No. 2006800140903, mailed on Nov. 3, 2010 (9 pages).
esp@cenet Patent Abstract for Chinese Publication No. 1269085, publication date Oct. 4, 2000. (1 page).
Supplementary European Search Report issued in European Application No. 06730060.8-2412, dated Apr. 14, 2011, 12 pages.
NTT DoCoMo: "Uplink Multiple Access Scheme for Evolved UTRA," 3GPP Draft; 3rd Generation Partnership Project (3GPP), [Online], vol. TGS RAN WG1, Mar. 30, 2005, pp. 1-7, XP002627181, Retrieved from the Internet: URL: http://list.etsi.org/scripts/wa.exe? A2=ind0503&L=3gpp_tsg_ran_wg1&T=0&O=A&P=10036.
"Scalable OFDMA Physical Layer in IEEE 802.16 WirelessMAN," Intel Technology Journal, vol. 8, No. 3, Aug. 20, 2004, pp. 201-212, 14 pages.
Japanese Office Action for Application No. 2009-191386, mailed on Jun. 21, 2011 (8 pages).
Patent Abstracts of Japan for Japanese Publication No. 2003-101499, publication date Apr. 4, 2003 (1 page).
Patent Abstracts of Japan for Japanese Publication No. 2001-197037, publication date Jul. 19, 2001 (1 page).
Office Action for European Application No. 06 730 060.8 dated Jun. 28, 2012 (9 pages).
Schnell, M. et., al. "A Promising New Wideband Multiple-Access Scheme for Future Mobile Communications Systems," Eur. Trans. Telecomm., vol. 10. Jul.-Aug. 1999, pp. 417-427.
Office Action for Taiwanese Patent Application No. 095110957 issued Jul. 25, 2012, with English translation thereof (7 pages).
Office Action issued in European Application No. 06730060.8, mailed on Aug. 6, 2014 (8 pages).
NTT Docomo: "Uplink Multiple Access Scheme for Evolved UTRA", 3GPP Draft; R1-050248, 3rd Generation Partnership Project (3GPP), Mobile Competence Centre ; 650, Route Des Lucioles ; F-06921 Sophia-Antipolis Cedex ; France, vol. Ran WG1, no. Beijing, China; 20050330, Mar. 30, 2005, XP050099911, [retrieved Mar. 30, 2005] (52 pages).
Office Action issued in corresponding Chinese Application No. 201110206783.5, mailed on Aug. 12, 2014 (11 pages).
Office Action issued in corresponding Chinese Application No. 20101052733.6, mailed on Sep. 4, 2014 (10 pages).
Office Action issued in corresponding Chinese Application No. 201010527133.6, mailed on Sep. 4, 2014 (10 pages).

* cited by examiner

PRIOR ART

FIG.2

| | | CONCRETE EXAMPLE OF CONTENTS OF TRANSMISSION DATA |
|---|---|---|
| CONTENTION BASED/SCHEDULED | | |
| CONTENTION-BASED CHANNEL | | RANDOM ACCESS CHANNEL (CHANNEL FOR TRANSMITTING SHORT DATA AND UPPER CONTROL CHANNEL) RESERVATION PACKET CHANNEL (CHANNEL FOR TRANSMITTING RESERVATION INFORMATION FOR SCHEDULING BEFORE TRANSMITTING SCHEDULED DATA CHANNEL) |
| SCHEDULED CHANNEL | CHANNEL FOR PERFORMING SCHEDULING ACCORDING TO CHANNEL STATUS | SHARED DATA CHANNEL (CHANNEL FOR TRANSMITTING PACKET DATA) |
| | CHANNEL FOR PERFORMING SCHEDULING IRRESPECTIVE OF CHANNEL STATUS | COMMON CONTROL CHANNEL (CHANNEL FOR TRANSMITTING COMMON INFORMATION) (WHEN PERFORMING FIXEDLY ASSIGNMENT, IT CAN BE CONSIDERED AS INDIVIDUAL CONTROL CHANNEL. INFORMATION OF RETRANSMISSION CONTROL FOR PACKETS, ASSIGNMENT INFORMATION FOR PACKET SCHEDULING, ....ETC.) |

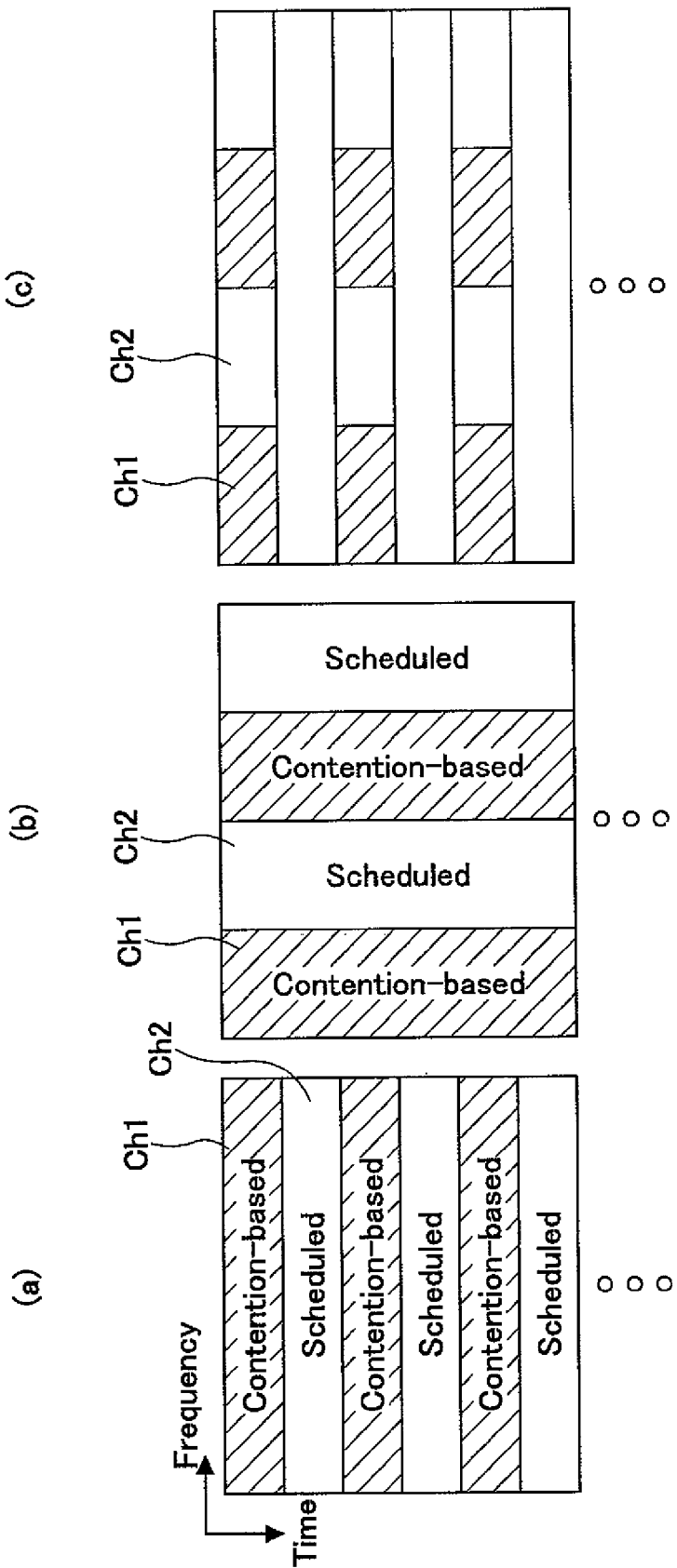

RADIO RESOURCE ASSIGNMENT METHOD FOR PHYSICAL CHANNEL IN UPLINK, AND TRANSMITTER FOR MOBILE APPARATUSES

TECHNICAL FIELD

The present invention relates to a radio resource assignment method for a physical channel in an uplink directed from a mobile apparatus to a base station in a mobile radio communication system, and relates to a transmitter for mobile apparatuses.

BACKGROUND ART

Development is being carried out for a mobile radio communication system of a next generation that is far superior to the capability of a third generation mobile radio communication system for which service has already started. This next generation mobile radio communication system aims transmission with higher speed and larger capacity, inter-system interconnection based on IP (Internet Protocol) networking, and the like.
[Patent document 1] WO2003/041438 (International Publication)

SUMMARY OF THE INVENTION

It is predicted that a channel band that is 5 MHz in the third generation W-CDMA (Wideband-Code Division Multiple Access) will be enlarged to about 20 MHz in the next generation radio communication system, so that it is desired to effectively assign a wide channel band to physical channels. In this case, it is necessary to consider frequency diversity (improvement of communication quality under frequency selective fading environment due to diversifying a signal to wide band) and multiuser diversity (improvement of communication quality under frequency selective fading environment due to assigning a signal of each user to a frequency block having a good channel status). By the way, it is effective to diversify a signal to wide band for obtaining the frequency diversity effect, but on the other hand, there is a problem in that, when a data rate of transmission data is low, transmission power density becomes small so that channel estimation accuracy is deteriorated. Thus, it becomes necessary to assign radio resources according to data rates.

On the other hand, in an uplink directed from a mobile apparatus to a base station in the mobile radio communication system, there is an uplink contention-based channel by which data transmission is performed irregularly from the mobile apparatus. Since a signal by this contention-based channel is a prerequisite for performing transmission of packet data by an uplink scheduled channel based on scheduling in the base station side, it is necessary that errors due to interference are small and that the signal is effectively transmitted to the base station side within a short time. As to such a signal directed from the mobile apparatus to the base station, the patent document 1 discloses a technique (power ramping technique) for decreasing interference to other mobile apparatuses by gradually increasing transmission power to send a signal intermittently until the base station side acknowledges receipt. According to this power ramping technique, since transmission is performed a plurality of times until the base station side acknowledges receipt, there is a problem in that transfer of reservation of scheduling and the like delays so that transmission of packet data after that delays.

In addition, in a conventional W-CDMA, as shown in FIG. 1, multiplexing is performed by CDM (Code Division Multiplex) in which the contention-based channel and the scheduled channel are separated by different spreading codes. But, deterioration due to inter-code interference is a problem. This is an unavoidable selection since priority is given to an advantage of using the entire channel band for the contention-based channel and the scheduled channel for obtaining the frequency diversity effect under a constraint that the channel band is 5 MHz.

The present invention is proposed in view of the above-mentioned points, and the object is to provide a radio resource assignment method for a physical channel in an uplink and a transmitter for mobile apparatuses that can properly perform radio resource assignment for a physical channel in an uplink directed to a mobile apparatus to a base station in a mobile radio communication system under an environment of the next generation mobile radio communication system.

In one or more embodiments of the present invention, a mobile station includes:
a scheduling control unit configured to assign a shared control channel to a channel band where a plurality of frequency blocks, each of which includes a plurality of subcarriers, are arranged in a frequency direction, and to assign a shared data channel to at least one of the frequency blocks of the channel band; and
a transmitting unit configured to transmit signals on the shared control channel and the shared data channel which are assigned in the scheduling control unit,
wherein the scheduling control unit performs assignment for the shared control channel so as to form a comb-shaped spectrum, and performs assignment for the shared data channel so as to form a continuous spectrum, and
wherein the scheduling control unit assigns the shared control channel over the whole channel band where the plurality of frequency blocks, each of which includes the plurality of subcarriers, are arranged in the frequency direction.

In addition, in one or more embodiments, a transmission method includes:
assigning a shared control channel to a channel band where a plurality of frequency blocks, each of which includes a plurality of subcarriers, are arranged in a frequency direction, and assigning a shared data channel to at least one of the frequency blocks of the channel band; and
transmitting signals on the shared control channel and the shared data channel which are assigned,
wherein the step of assigning performs assignment for the shared control channel so as to form a comb-shaped spectrum, and performs assignment for the shared data channel so as to form a continuous spectrum, and
wherein the step of assigning assigns the shared control channel over the whole channel band where the plurality of frequency blocks, each of which includes the plurality of subcarriers, are arranged in the frequency direction.

In addition, in one or more embodiments, a mobile radio communication system includes:
a mobile station configured to assign a shared control channel to a channel band where a plurality of frequency blocks, each of which includes a plurality of subcarriers, are arranged in a frequency direction, to assign a shared data channel to at least one of the frequency blocks of the channel band, and to transmit signals on the shared control channel and the shared data channel which are unassigned; and
a base station configured to receive the shared data control channel and the shared control channel from the mobile station, wherein the mobile station performs assignment for the shared control channel so as to form a comb-shaped spectrum, and performs assignment for the shared data channel so as to form a continuous spectrum, and wherein the mobile station assigns the shared control channel over the whole channel band where the plurality of frequency blocks, each of which includes the plurality of sub-carriers, are arranged in the frequency direction.

In the radio resource assignment method for the physical channel in the uplink, and the transmitter for mobile apparatus use of the present invention, code separation is not adopted for dividing between the contention-based channel and the scheduled channel, frequency diversity and multiuser diversity are effectively applied, the power ramping technique is not adopted, assignment of radio resources according to data rates and the like is performed. Thus, radio resource assignment for physical channel in the uplink directed from a mobile apparatus to a base station in a mobile radio communication system can be properly performed under an environment of a next generation mobile radio communication system.

BRIEF DESCRIPTION OF THE DRAWINGS

FIG. 2 is a diagram showing examples of physical channels in an uplink;

FIG. 3 is a diagram showing examples of a method for multiplexing the contention-based channel and the scheduled channel;

Figure 1:
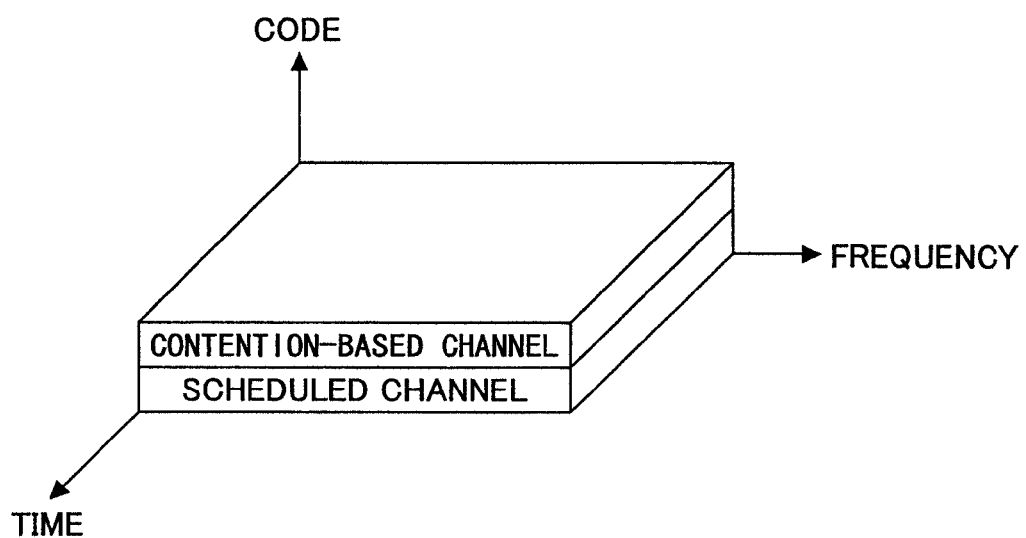
FIG. 1 is a schematic diagram of multiplexing of a contention-based channel and a scheduled channel by CDM in conventional W-CDMA.

DESCRIPTION OF REFERENCE SIGNS 101 transmission data generation unit
102 channel coding unit
103 data modulation unit
104 spreading unit
105 symbol repetition unit
106 frequency offset adding unit
107 CP/ZP adding unit
108 data modulation/spreading factor/channel coding control unit
109 frequency diversity/scheduling control unit
110 Q point FFT unit
111 frequency domain signal generation unit
112 Nsub point IFFT unit
113 S/P conversion unit
114 frequency domain signal generation unit
115 switch unit

PREFERRED EMBODIMENTS FOR CARRYING OUT THE INVENTION

In the following, preferred embodiments of the present invention are described with reference drawings.

FIG. 2 is a diagram showing examples of physical channels in the uplink. In FIG. 2, the physical channel in the uplink can be largely classified to the contention-based channel and the scheduled channel. The contention-based channel includes a random access channel that is a channel used when sending short data or an upper control signal, a reservation packet channel that is a channel for sending reservation information for scheduling before transmitting the scheduled data channel, or the like.

The scheduled channel is classified to a channel for which scheduling is performed according to channel status and a channel for which scheduling is performed irrespective of channel status. The channel for which scheduling is performed according to channel status includes a shared data channel that is a channel for transmitting packet data. In addition, the channel for which scheduling is performed irrespective of channel status includes a common control channel that is a channel for transmitting control information. But, when fixed assignment is performed, the common control channel may be considered to be an individual control channel.

FIG. 3 is a diagram showing examples of methods for multiplexing the contention-based channel and the scheduled channel. FIG. 3(a) shows a case for multiplexing a contention-based channel Ch1 and a scheduled channel Ch2 by assigning radio resources in a time division multiplexing (TDM) scheme. FIG. 3(b) shows a case for multiplexing a contention-based channel Ch1 and a scheduled channel Ch2 by assigning radio resources in a frequency division multiplexing (FDM) scheme. FIG. 3(c) shows a case for multiplexing a contention-based channel Ch1 and a scheduled channel Ch2 by assigning radio resources in a hybrid scheme of the time division multiplexing scheme and the frequency division multiplexing scheme. As mentioned before, in the conventional W-CDMA, since multiplexing is performed by CDM, deterioration due to inter-code interference is a problem. But, by adopting the time division scheme, the frequency division scheme or the hybrid scheme of the time division scheme and the frequency division scheme, signals can be completely separated in time or in frequency, so that such a problem is eliminated. By the way, in the cases of FIGS. 3(b) and (c), frequency band of the contention-based channel Ch1 and the scheduled channel Ch2 is decreased compared with the case of FIG. 3(a) in which the entire channel band is used continuously. But, since the channel band that is 5 MHz in the conventional W-CDMA is increased to about 20 MHz in the next generation mobile radio communication system, enough bandwidth for obtaining the frequency diversity effect can be kept. In addition, as shown in FIGS. 3(b) and (c), since the contention-based channel Ch1 and the scheduled channel Ch2 are distributed over the entire channel band, enough frequency diversity effect can be obtained also in this point.

By the way, the present invention is not limited to any one of a single carrier scheme such as DS-CDMA (Direct Sequence Code Division Multiple Access), IFDMA (Interleaved Frequency Division Multiple Access), VSCRF-CDMA (Variable Spreading and Chip Repetition Factors Code Division Multiple Access), etc. and a multi-carrier scheme such as OFDM (Orthogonal Frequency Division Multiplexing), Spread OFDM, MC-CDMA (Multi-Carrier Code Division Multiple Access) and VSF-Spread OFDM (Variable Spreading Factor—Spread Orthogonal Frequency Division Multiplexing), etc., but the present invention can be applied to both of the schemes.

Figure 4:
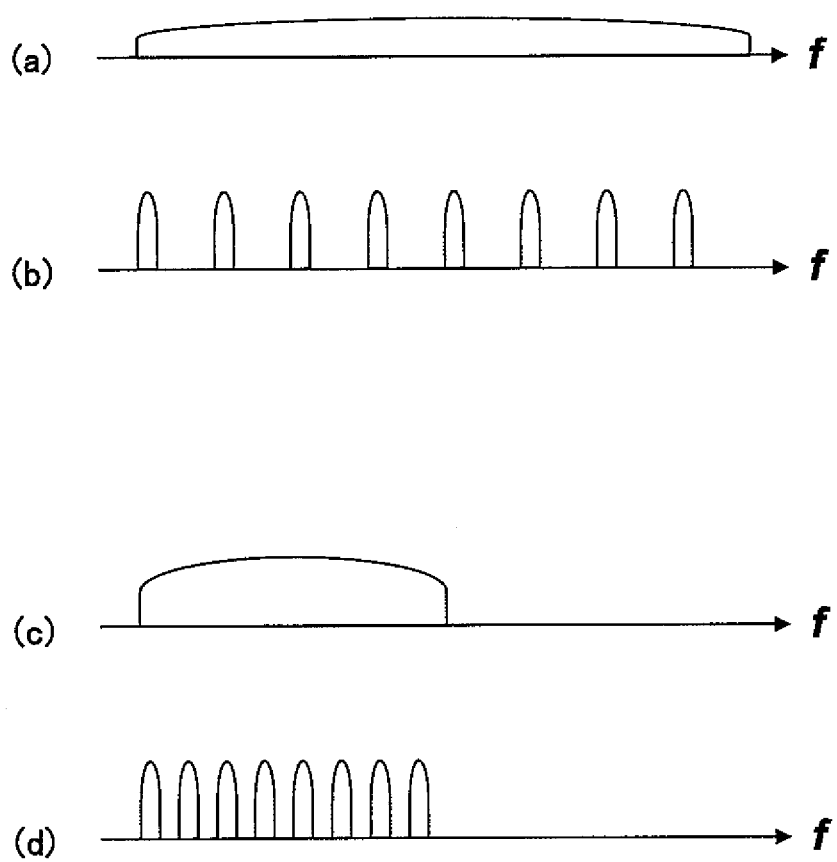
FIG. 4 is a diagram showing examples of a radio resource assignment method for the contention-based channel.

Next, FIG. 4 is a diagram showing examples of radio resource assignment methods for the contention-based channel. FIGS. 4(a) and (b) show cases of assigning an entire channel band to the contention-based channel. In FIG. 4(a), a continuous spectrum is formed in the assigned frequency band, and in FIG. 4(b), a comb-shaped spectrum is formed in the assigned frequency band. In the case of the continuous spectrum shown in FIG. 4(a), contention is performed by CDMA and the like, and in the case of the comb-shaped spectrum shown in FIG. 4(b), contention is performed FDMA and CDMA and the like by shifting a position of the comb teeth on the frequency domain. In addition, FIGS. 4(c) and (d) show cases where a frequency block formed by one or more chunks is assigned to the contention-based channel. FIG. 4(c) shows a case forming a continuous spectrum on the assigned frequency band, and FIG. 4(d) shows a case forming a comb-shaped spectrum on the assigned frequency band. Also in this case, in the case of the continuous spectrum shown in FIG. 4(c), contention is performed by CDMA and the like, and in the case of the comb-shaped spectrum shown in FIG. 4(d), contention is performed by FDMA and CDMA and the like.

As mentioned before, since the signal by the contention-based channel is a prerequisite for transmission, after the signal, of packet data by the scheduled channel based on scheduling in the base station side, the signal needs to have few errors due to interference and needs to be effectively transmitted to the base station side within a short period. In the cases of FIGS. 4(a) and (b), since the signal is distributed over the entire channel band, large frequency diversity effect can be obtained and variation of received signals decreases so that stable communication becomes available. Therefore, it becomes possible to decrease transmission power density, adoption of the power ramping technique that is conventionally performed can be eliminated or decreased, so that occurrence of delay due to the power ramping technique can be avoided.

By the way, in the cases of FIGS. 4(c) and (d), frequency band of the contention-based channel is decreased compared with the case of FIGS. 4(a) and (b) in which the entire channel band is used. But, since the channel band that is 5 MHz in the conventional W-CDMA is increased to about 20 MHz in the next generation mobile radio communication system, enough bandwidth for obtaining frequency diversity can be kept.

In addition, as shown in FIGS. 4(b) and (d), interference can be decreased by FDM by forming the comb-shaped spectrum and shifting frequencies from other users (mobile apparatuses).

In addition, FIGS. 4(a) and (b) are advantageous when a data rate of transmission data is large, and FIGS. 4(c) and (d) are advantageous when a data rate of the transmission data is small. That is, when the data raze of transmission data is small, transmission power density becomes small according to the cases of FIGS. 4(a) and (b) so that there is a problem in that channel estimation accuracy when receiving deteriorates. But, in such a case, deterioration of channel estimation accuracy can be prevented by narrowing frequency band so as not to use unnecessary large bandwidth as shown in FIGS. 4(c) and (d).

Figure 5:
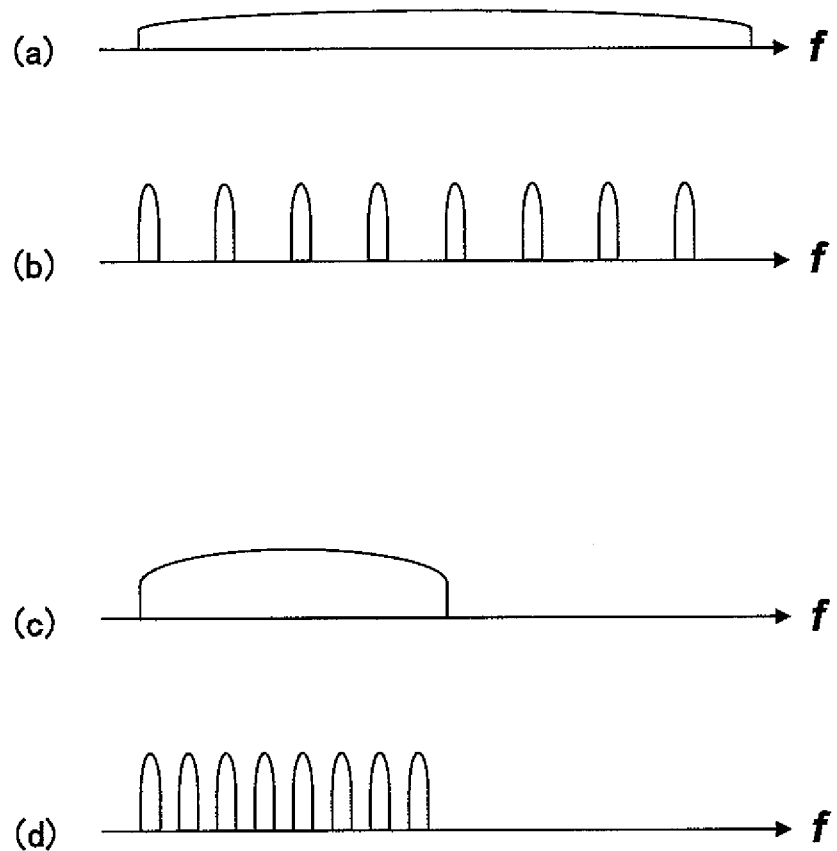
FIG. 5 is a diagram showing examples of a radio resource assignment method for a common control channel of scheduled channels.

FIG. 5 is a diagram showing an example of a radio resource assignment method for a common control channel of scheduled channels. As shown in the diagram, radio resource assignment similar to that of the before mentioned case of the contention-based channel shown in FIG. 4 is performed. That is, the common control channel is essential for adaptive control and ARQ (Automatic Repeat reQuest) according to channel status, low block error rate (BLER) is required, and ARQ cannot be applied to the common control channel itself. Thus, stability by the frequency diversity effect is valued. By the way, based on tradeoff between required block error rate and channel estimation accuracy, FIGS. 5(a) and (b) can be adopted when a low block error rate is required, and FIGS. 5(c) and (d) can be adopted when a required block error rate is not so low.

Figure 6:
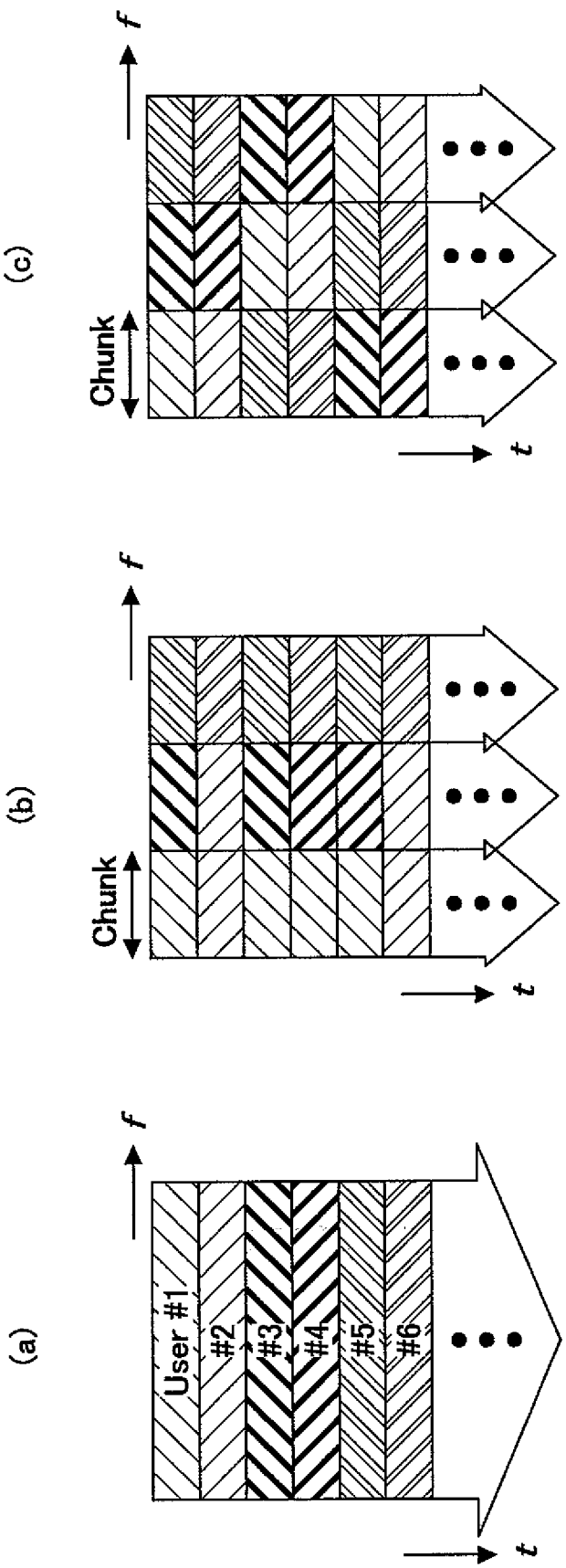
FIG. 6 is a diagram showing examples of a radio resource assignment method for a shared data channel of scheduled channels.

FIG. 6 is a diagram showing examples of radio resource assignment methods for a shared data channel of scheduled channels. FIG. 6(a) shows a case where the entire channel band is assigned to the shared data channel of scheduled channels to perform scheduling for users #1, #2, #3 . . . in a time domain. In this case, although maximum frequency diversity effect can be obtained, multiuser diversity effect is small. By the way, a pilot transmitted by an uplink for CQI measurement is for the entire channel band.

FIG. 6(b) shows a case for performing scheduling in the time domain by fixing a chunk in the frequency domain for the shared data channel of scheduled channels (including a case where equal to or more than two chunks are fixedly assigned to a user of large data). In this case, the multiuser diversity effect is obtained only in the time domain. As a frequency band of the chunk, large sized one is required in order to be able to accommodate the user of large data. For example, a band such as 1.25 MHz, 5 MHz, 10 MHz, and 20 MHz can be supposed. By the way, the pilot transmitted by the uplink for CQI measurement becomes one for a band assigned beforehand.

FIG. 6(c) shows a case for performing scheduling using chunks of the frequency domain and the time domain for the shared data channel of scheduled channels. In this case, large multiuser diversity effect can be obtained for both of the frequency domain and the time domain. As a frequency band of the chunk, a small sized one is required for obtaining the multiuser diversity effect. For example, a band such as 0.3125 MHz, 0.625 MHz, 1.25 MHz, 2.5 MHz, 5 MHz, 10 MHz, and 20 MHz can be supposed. By the way, a pilot transmitted by the uplink for CQI measurement becomes one for the entire channel band since it is unknown which frequency band is assigned in the scheduling.

Figure 7:
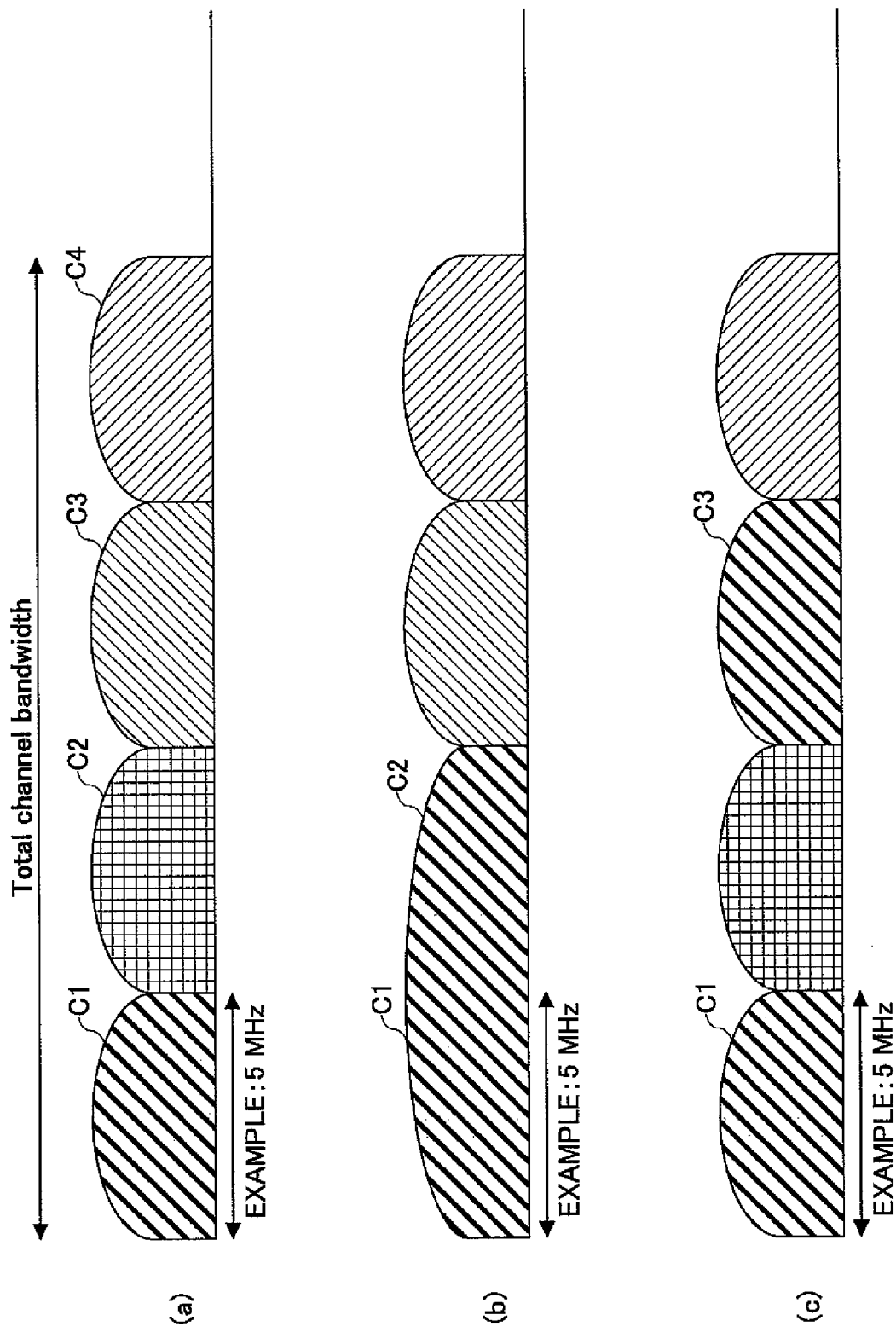
FIG. 7 is a diagram showing examples of assignment in a case where the frequency domain chunk is fixed and scheduling is performed in a time domain.

FIG. 7 is a diagram showing an example of assignment in a case, shown in FIG. 6(b), in which the frequency domain chunk is fixed and scheduling is performed in the time domain. FIG. 7(a) shows a status in which users are scheduled be assigned to the chunks C1-C4 in the frequency direction respectively. FIG. 7(b) shows a status in which adjacent chunks C1 and C2 are scheduled to be assigned to a same user, and shows a status in which a center frequency of a radio parameter is shifted to a center of the two chunks C1 and C2 to double the bandwidth so that the two chunks operate in the same way as one chunk. Of course, it is possible to cause the chunk as two chunks. FIG. 7(c) shows a status in which separated chunks C1 and C3 are scheduled to be assigned to a same user.

Figure 8:
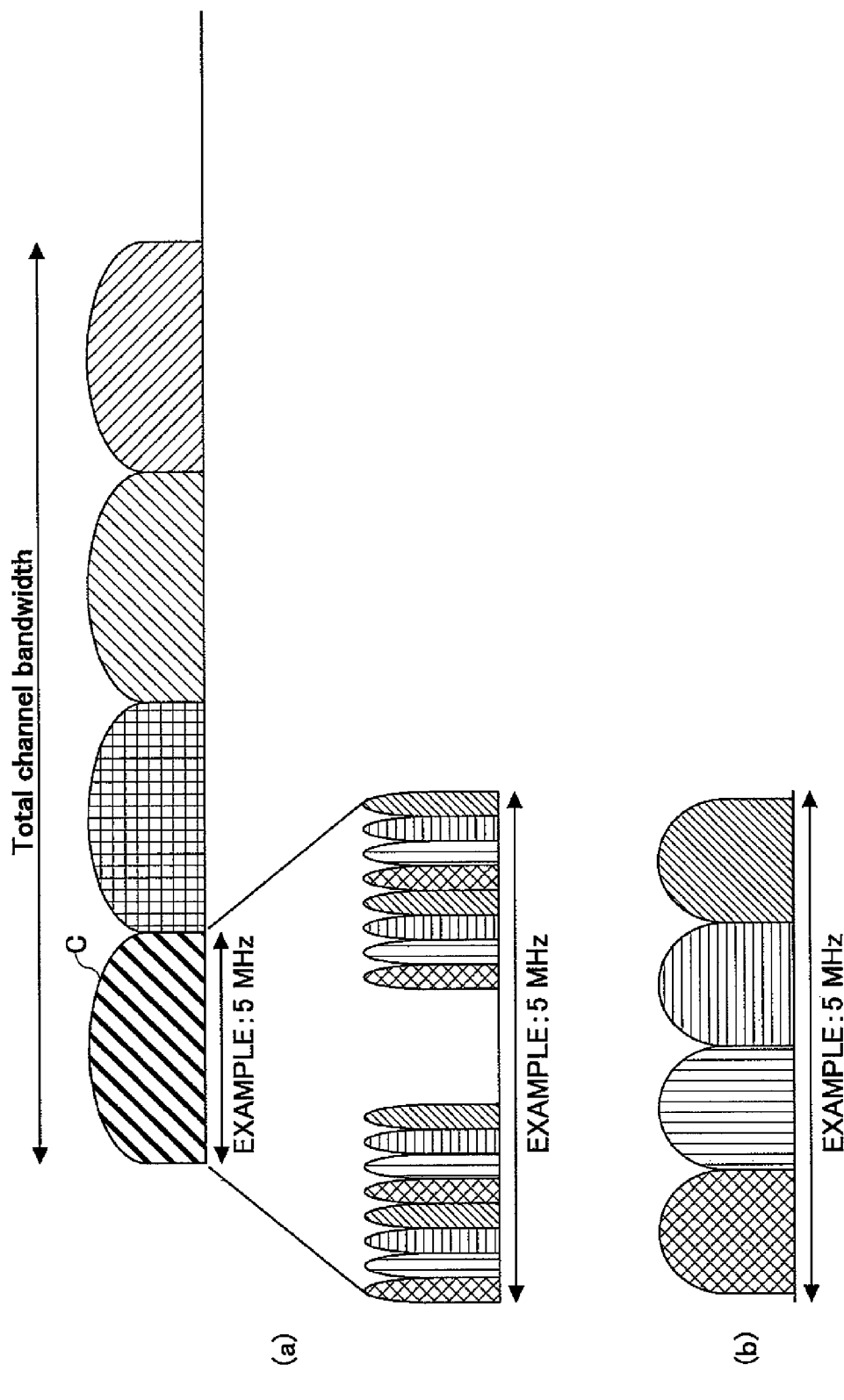
FIG. 8 is a diagram showing examples of converting a chunk to sub-chunks when performing scheduling in the time domain by fixing the chunk of the frequency domain.

FIG. 8 is a diagram showing an example of converting a chunk to sub-chunks when performing scheduling in the time domain by fixing the chunk of the frequency domain as shown in FIG. 6(b). That is, since a band of the chunk (the figure shows 5 MHz as an example) cannot be used effectively by assigning a user in units of a chunk when the data rate is low, a plurality of users are multiplexed into a chunk. FIG. 8(a) shows an example in which multiplexing is performed by dividing an individual chunk C into frequencies using the comb-shaped spectrum. In this case, when a band corresponding to a tooth of the comb becomes too small, it becomes more likely to be affected by phase noise. Thus, it is necessary to pay attention to the smallest size. In addition, FIG. 8(b) shows an example in which multiplexing is performed by normal frequency division. By the way, instead of the comb-shaped spectrum or the normal frequency division, multiplexing may be performed using time division or code division.

Figure 9:
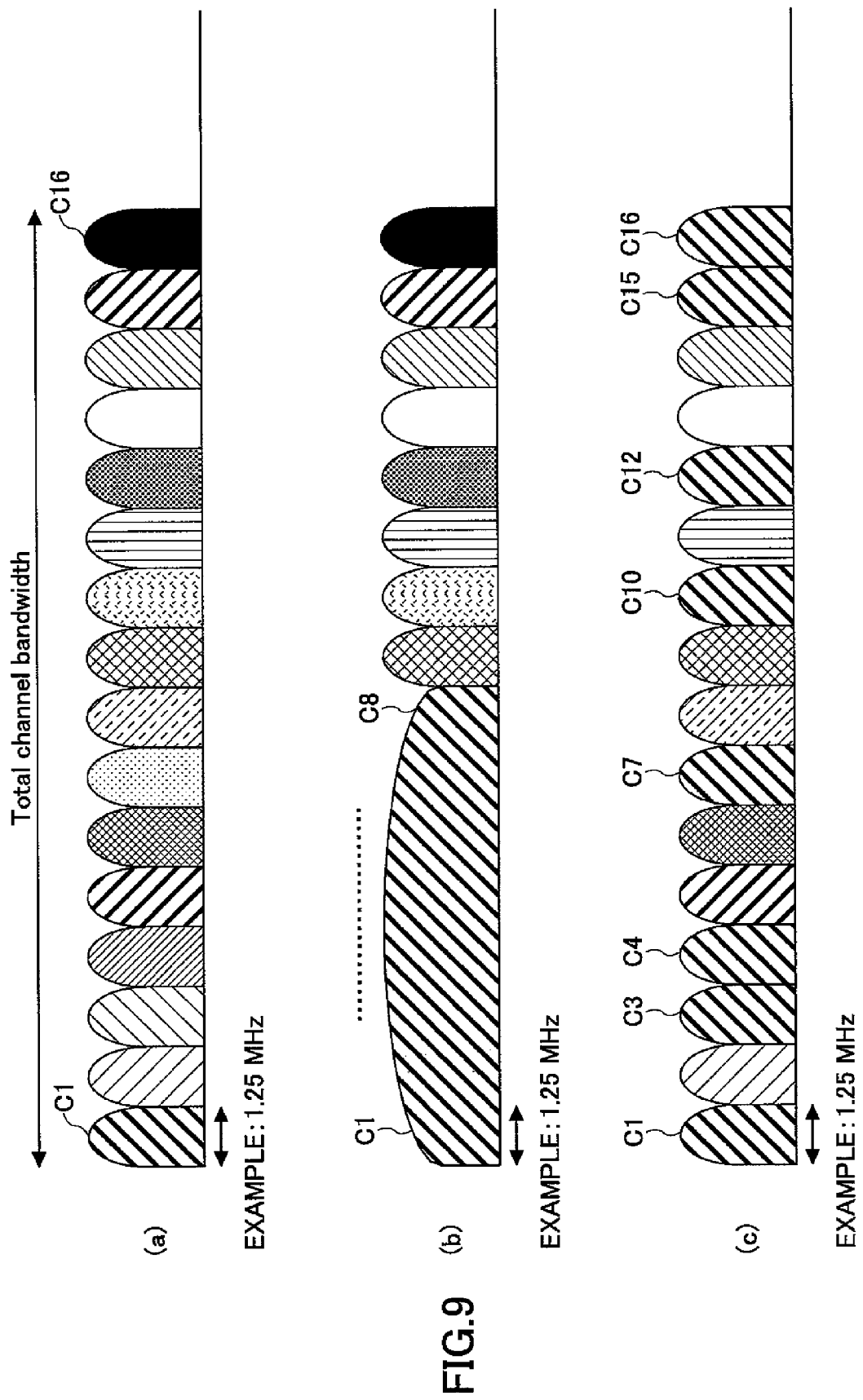
FIG. 9 is a diagram showing examples of assignment when performing scheduling in the frequency domain and the time domain.

FIG. 9 shows a diagram showing examples of assignment when performing scheduling in the frequency domain and the time domain. FIG. 9(a) shows a status in which different users are scheduled to be assigned to chunks C1-C16 respectively in the frequency direction. FIG. 9(b) shows a status in which a same user is scheduled to be assigned to consecutive chunks C1-C8. In the case, a center frequency of the radio parameter is shifted to a center of the chunks C1-C8 and an eight times bandwidth is used such that it operates in the same way as operation of one chunk. Of course, it is possible to cause it to operate as eight chunks. FIG. 9(c) shows a state in which separated chunks C1, C3, C4, C7, C10, C12, C15 and C16 are scheduled to be assigned to a same user.

Figure 10:
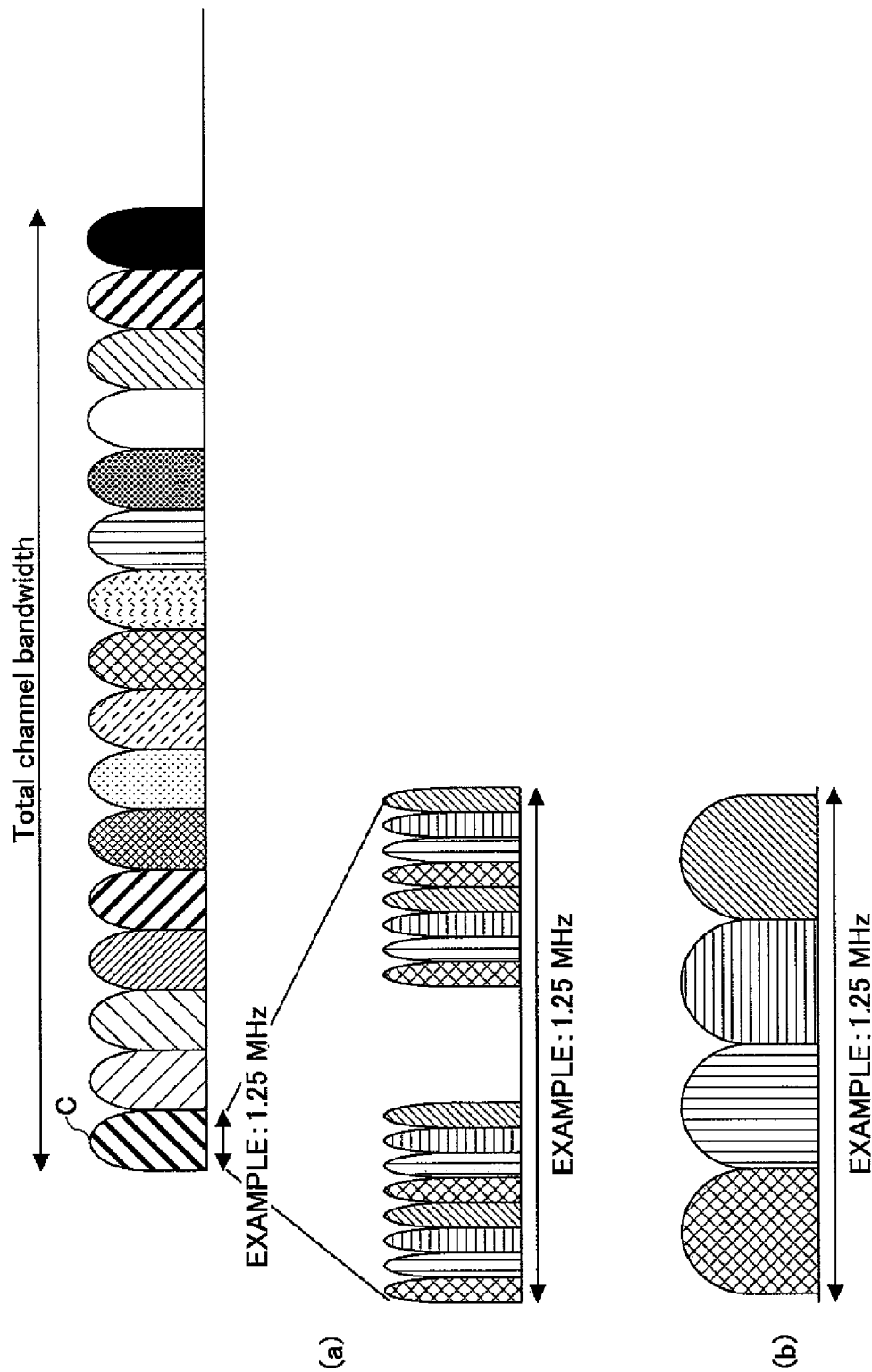
FIG. 10 is a diagram showing examples of converting a chunk to sub-chunks when performing scheduling in the frequency domain and the time domain.

FIG. 10 is a diagram showing examples of converting a chunk to sub-chunks when performing scheduling in the frequency domain and the time domain as shown in FIG. 6(c). Also in this case, since a band of the chunk (the figure shows 1.25 MHz as an example) cannot be used effectively by assigning users in units of a chunk when the data rate is low, a plurality of users are multiplexed into a chunk. FIG. 10(a) shows an example in which multiplexing is performed by dividing an individual chunk C into frequencies using the comb-shaped spectrum. In this case, when a band corresponding to a tooth of the comb becomes too small, it becomes more likely to be affected by phase noise. Thus, it is necessary to pay attention to a smallest size. In addition, FIG. 10(b) shows an example in which multiplexing is performed by normal frequency division. By the way, instead of the comb-shaped spectrum or normal frequency division, multiplexing may be performed using time division or code division.

Figure 11:
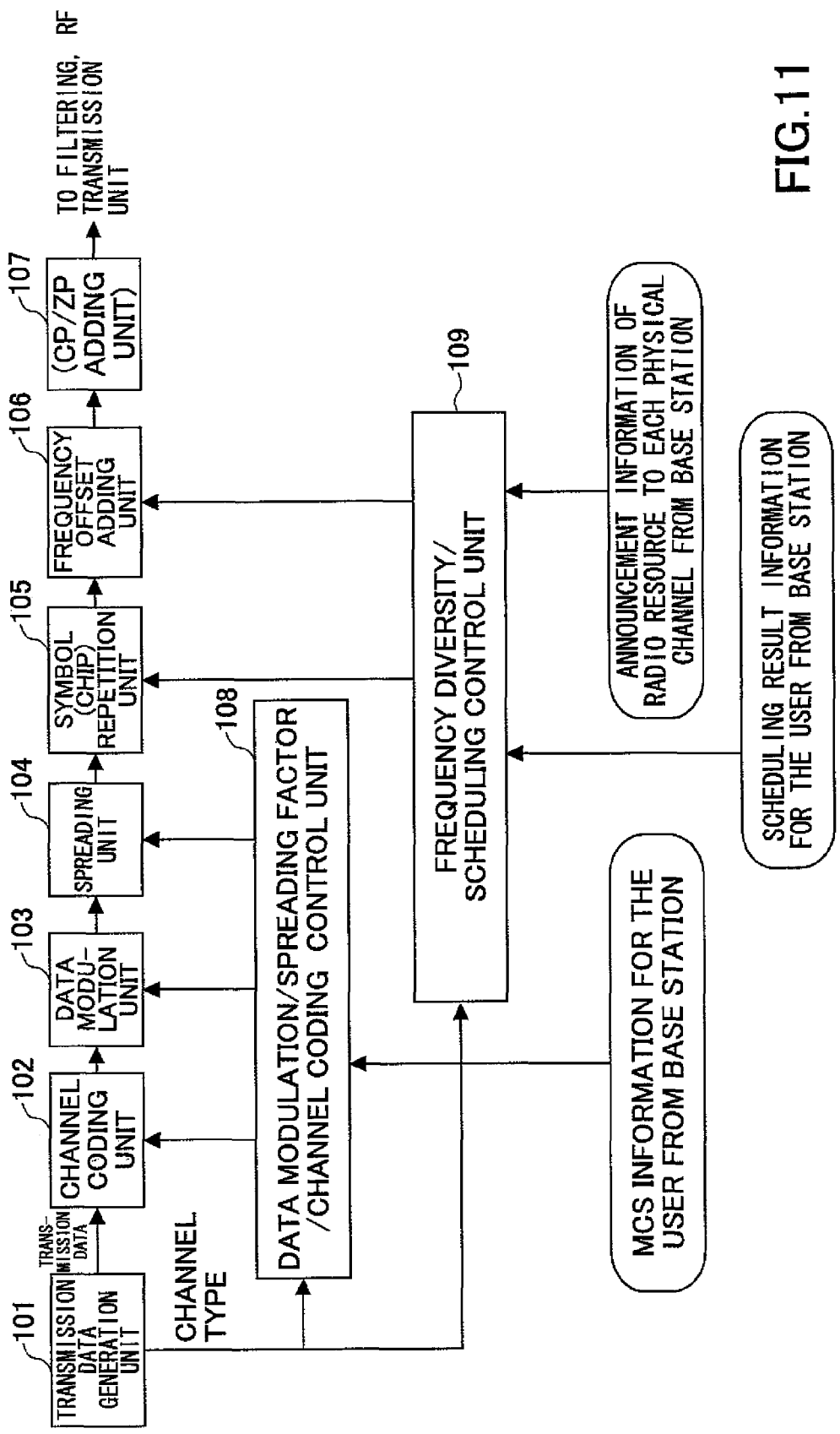
FIG. 11 is a diagram showing a configuration example of a transmitter for mobile apparatuses based on time domain processing supporting a single carrier scheme.

Next, FIG. 11 is a diagram showing a configuration example of a transmitter for mobile apparatuses based on time domain processing corresponding to a single carrier scheme. In FIG. 11, the transmitter for mobile apparatuses includes a transmission data generation unit 101 for generating transmission data, a channel coding unit 102 for performing channel coding on transmission data, a data modulation unit 103 for modulating the channel coded transmission data, and a spreading unit 104 for performing spreading on the modulated transmission data. In addition, the transmitter includes a symbol repetition unit 105 for repeating symbols (chips) of the spread transmission data, a frequency offset adding unit 106 for providing a frequency offset of each user to transmission data in which symbols are repeated, and a CP/ZP adding unit 107 for adding CP (Cyclic Prefix) or ZP (Zero Padding) as a guard interval to the transmission data to which the frequency offset is added. An output signal of the CP/ZP adding unit 107 is provided to a RF (Radio Frequency) transmission unit via filtering not shown in the diagram, and is transmitted.

In addition, the transmitter includes, as control units, a data modulation/spreading factor/channel coding control unit 108 for controlling the channel coding unit 102, the data modulation unit 103 and the spreading unit 104 according to a channel type of the transmission data and MCS (Modulation and Coding Scheme) information for the user provided from the base station, and a frequency diversity/scheduling control unit 109 for controlling the symbol repetition unit. 105 and the frequency offset adding unit 106 according to the channel type of the transmission data, announcement information, provided from the base station, of radio resource assignment to each physical channel, and scheduling result information for the user.

In the operation, the transmitter generates a transmission signal by performing radio resource assignment according to the multiplexing method shown in FIG. 3, and further, generates a transmission signal by assigning radio resources for each channel as shown in FIGS. 4-6 under control of the data modulation/spreading factor/channel coding control unit 108 and the frequency diversity/scheduling control unit 109 according to a channel type of transmission data, that is, according to whether it is the contention-based channel or the scheduled channel, in addition, according to whether it is the common control channel or the shared data channel when the type is the scheduled channel.

In this operation, the symbol repetition unit 105 compresses chips that are output signals from the spreading unit 104 into each block every Q chips, and repeats it CRF (Chip Repetition Factor) times. When CRF=1 (when repetition is not performed), the continuous spectrum shown in FIGS. 4(a)(c) and FIGS. 5(a)(c) is formed. When CRF>1, the comb-shaped spectrum shown in FIGS. 4(b)(d) and FIGS. 5(b)(d) is formed.

Figure 12:
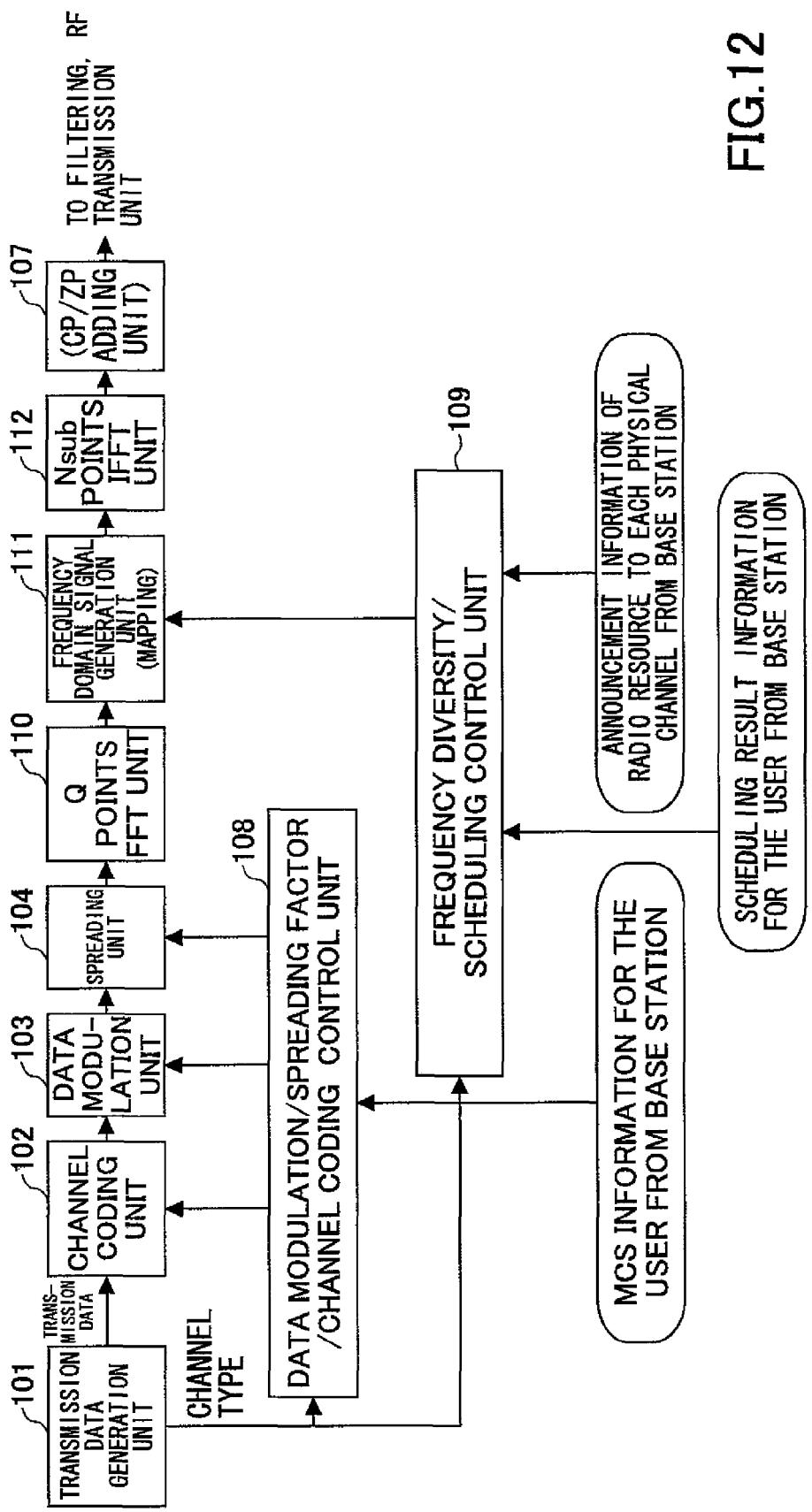
FIG. 12 shows a configuration example of a transmitter for mobile apparatuses using frequency domain processing supporting the single carrier scheme.

FIG. 12 shows a configuration example or a transmitter for mobile apparatuses using frequency domain processing supporting the single carrier scheme. Although comb-shaped spectrum is formed by time domain processing in FIG. 11, same processing can be performed by frequency domain processing in this configuration of FIG. 12. In FIG. 12, the configuration of the transmitter for mobile apparatuses is different from one shown in FIG. 11, in that, instead of the symbol repeating unit 105 and the frequency offset adding unit 106 in FIG. 11, the transmitter is provided with a Q point FFT unit 110 for converting the spread transmission data into a signal in the frequency domain, a frequency domain signal generation unit 111 for mapping the transmission data that has been converted into the frequency domain to the frequency domain, and a Nsub point IFFT unit 112 for converting the transmission data mapped to the frequency domain into signals of the time domain, and that the frequency domain signal generation unit 111 is controlled by the frequency diversity/scheduling control unit 109, and other configuration is the same.

In this configuration, the Q point FFT unit 110 converts the spread transmission data into Q signals of the frequency domain. The frequency domain signal generation unit 111 performs rate conversion to enlarge a frame to a number of sub-carriers Nsub (=Q×CRF), and provides frequency offsets for each user and add "0" to parts other than parts assigned to the users. Then, the Nsub point IFFT unit 112 performs inverse Fourier transform from the frequency domain signals of the number of sub-carriers Nsub to convert the signals into time domain signals. When CRF=1 (Nsub=Q), the continuous spectrum shown in FIGS. 4(a)(c) and FIGS. 5(a)(c) is formed, and when CRF>1, the comb-shaped spectrum shown in FIGS. 4(b)(d) and FIGS. 5(b)(d) is formed, which are the same as the before-mentioned example.

Figure 13:
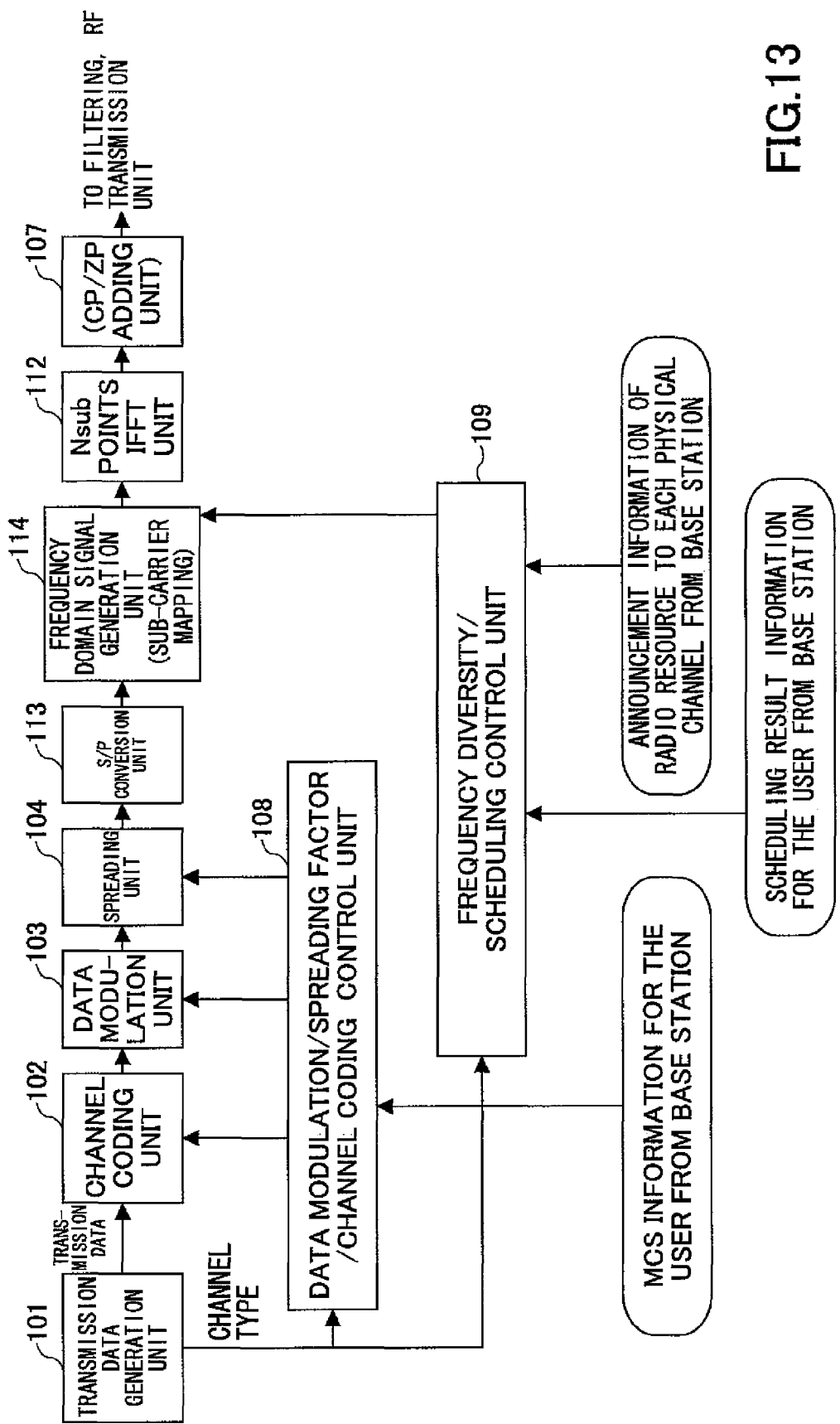
FIG. 13 is a diagram showing a configuration example of a transmitter for mobile apparatuses supporting the multi-carrier scheme.

Next, FIG. 13 is a diagram showing a configuration example of a transmitter for mobile apparatuses supporting a multi-carrier scheme. In FIG. 13, the configuration of the transmitter for mobile apparatuses is different from that of FIG. 12 in that, instead of the Q point FFT unit 111 and the frequency domain signal generation unit 111 of FIG. 12, the transmitter is provided with a S/P conversion unit 113 for converting spread transmission data (serial signal) into parallel signals and a frequency domain signal generation unit 114 for mapping the transmission data converted into the parallel signals into the frequency domain, and that the frequency domain signal generation unit 114 is controlled by the frequency diversity/scheduling control unit 109. Other configuration is the same.

In this configuration, the S/P conversion unit of FIG. 13 converts the spread transmission data to Nsub signals and passes them to the frequency domain signal generation unit 114. In mapping to sub-carriers in the frequency domain signal generation unit 114, when the transmission signal of the user is continuously mapped, the continuous spectrum shown in FIGS. 4(a)(c) and FIGS. 5(a)(c) is formed. When the transmission data is mapped at predetermined intervals, the comb-shaped spectrum is formed as shown in FIGS. 4(b)(d) and FIGS. 5(b)(d).

Figure 14:
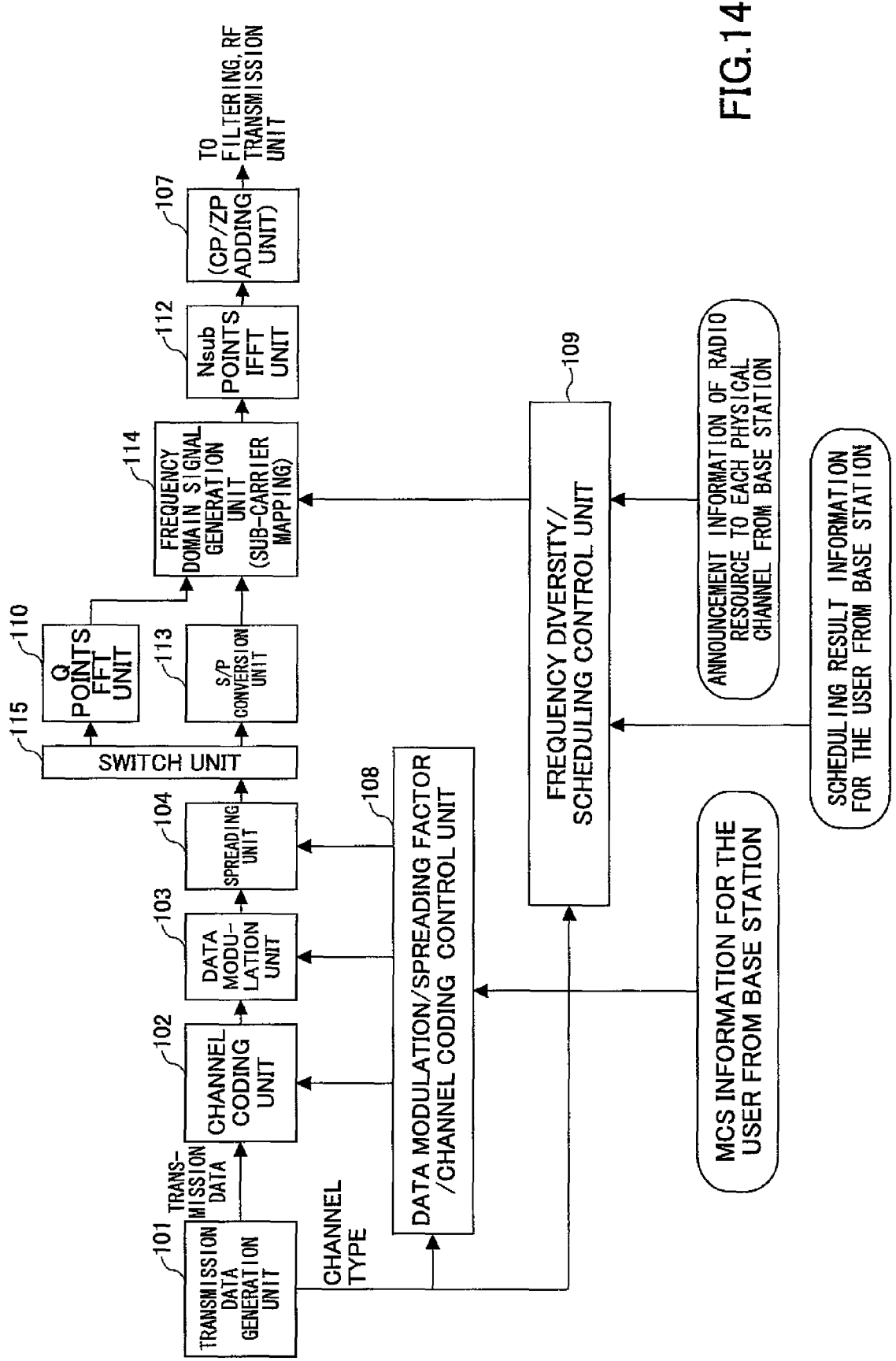
FIG. 14 is a diagram showing a configuration example of a transmitter for mobile apparatuses supporting the both schemes of the single carrier scheme and the multi-carrier scheme.

Next, FIG. 14 is a diagram showing a configuration example of a transmitter for mobile apparatuses supporting the both schemes of the single carrier scheme and the multi-carrier scheme. This configuration is a hybrid of the configuration of the signal carrier scheme shown in FIG. 12 and the configuration of the multi-carrier scheme shown in FIG. 13, and it is provided with a switch unit. 115, after the spreading unit 104, for selecting and branching the spread transmission data to the Q point FFT unit 110 and the S/P conversion unit 113.

The operation is the same as that of the single carrier scheme shown in FIG. 12 in a state when the switch unit 115 selects the Q point FFT unit 1 side, and the operation is the same as that of the multi-carrier scheme shown in FIG. 13 in a state when the switch unit 115 selects the S/P conversion unit 113 side.

As mentioned above, the present invention is described by preferred embodiments of the present invention. Although the present invention is described by showing particular concrete examples, it is apparent that variations and modifications may be made for these concrete examples without departing from the wide effect and scope of the present invention defined in the claims. That is, the present invention should not be interpreted to be limited by details of the concrete examples and the attached drawings.

The present international application claims priority based on Japanese patent application No. 2005-105498, filed in the JPO on Mar. 31, 2005, the entire contents of which are incorporated herein by reference.

The invention claimed is:

1. A mobile station comprising:
a scheduling control unit configured to assign a shared control channel to a channel band where a plurality of frequency blocks, each of which includes a plurality of subcarriers, are arranged in a frequency direction, and to assign a shared data channel to at least one of the frequency blocks of the channel band; and
a transmitting unit configured to transmit signals on the shared control channel and the shared data channel which are assigned in the scheduling control unit,
wherein the scheduling control unit performs assignment for the shared control channel so as to form a comb-shaped spectrum, and performs assignment for the shared data channel so as to form a continuous spectrum, and
wherein the scheduling control unit assigns the shared control channel over the whole channel band where the plurality of frequency blocks, each of which includes the plurality of subcarriers, are arranged in the frequency direction.

2. A transmission method comprising the steps of:
assigning a shared control channel to a channel band where a plurality of frequency blocks, each of which includes a plurality of subcarriers, are arranged in a frequency direction, and assigning a shared data channel to at least one of the frequency blocks of the channel band; and
transmitting signals on the shared control channel and the shared data channel which are assigned,
wherein the step of assigning performs assignment for the shared control channel so as to form a comb-shaped spectrum, and performs assignment for the shared data channel so as to form a continuous spectrum, and
wherein the step of assigning assigns the shared control channel over the whole channel band where the plurality of frequency blocks, each of which includes the plurality of subcarriers, are arranged in the frequency direction.

3. A mobile radio communication system comprising:
a mobile station configured to assign a shared control channel to a channel band where a plurality of frequency blocks, each of which includes a plurality of subcarriers, are arranged in a frequency direction, to assign a shared data channel to at least one of the frequency blocks of the channel band, and to transmit signals on the shared control channel and the shared data channel which are unassigned; and
a base station configured to receive the shared data control channel and the shared control channel from the mobile station,
wherein the mobile station performs assignment for the shared control channel so as to form a comb-shaped spectrum, and performs assignment for the shared data channel so as to form a continuous spectrum, and
wherein the mobile station assigns the shared control channel over the whole channel band where the plurality of frequency blocks, each of which includes the plurality of subcarriers, are arranged in the frequency direction.

* * * * *